United States Patent [19]

Lewinger et al.

[11] 4,301,718
[45] Nov. 24, 1981

[54] ROTARY RETORT

[75] Inventors: Nathan Lewinger, Rochester, N.Y.; Santi R. Bhowmik, Highland Park, N.J.

[73] Assignee: Pennant Products, Inc., Rochester, N.Y.

[21] Appl. No.: 87,975

[22] Filed: Oct. 25, 1979

[51] Int. Cl.³ .............................................. A23L 3/10
[52] U.S. Cl. .................................... 99/359; 366/214
[58] Field of Search ................ 99/359, 360, 366–367, 99/368, 370–371; 426/405; 198/342, 646, 655–656–667, 803; 126/144, 275 E; 366/213–214

[56] References Cited

U.S. PATENT DOCUMENTS

| | | | |
|---|---|---|---|
| 628,554 | 7/1899 | Smith | 99/366 X |
| 812,154 | 2/1906 | Scott et al. | 99/366 |
| 1,449,246 | 3/1923 | Rarig | 99/366 X |
| 1,709,175 | 4/1929 | Huygen | 99/370 |
| 2,569,656 | 10/1951 | Chissom et al. | 99/360 |
| 2,696,775 | 12/1954 | Dean | 99/359 X |
| 3,928,045 | 12/1925 | Tsunoda et al. | 99/359 X |

Primary Examiner—Philip R. Coe
Assistant Examiner—Arthur O. Henderson
Attorney, Agent, or Firm—Lawrence P. Kessler

[57] ABSTRACT

An improved rotary retort for cooking food products in sealed containers. The retort comprises a vessel including a substantially cylindrical shell and a pair of heads respectively closing the ends of the shell. A support for carrying the sealed containers is rotatably mounted within the vessel. The support includes at least one U-shaped channel member having integral lips located on the upstanding portions of the U-shaped channel, whereby a plurality of sealed containers received in the channel are retained in the channel by the lips. The support is rotated in the vessel, and the interior of the vessel is selectively heated and cooled as the support is rotated to accomplish complete processing of the food products within the sealed containers.

7 Claims, 5 Drawing Figures

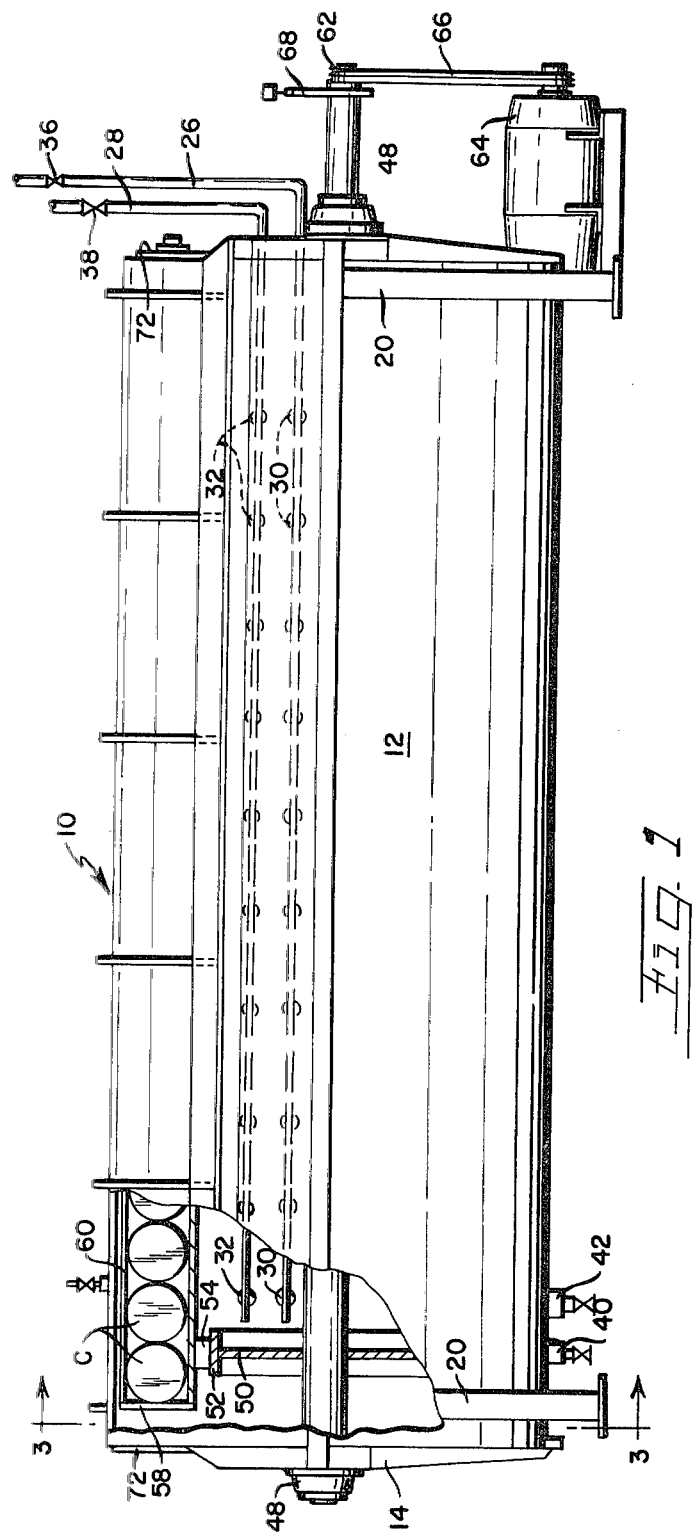

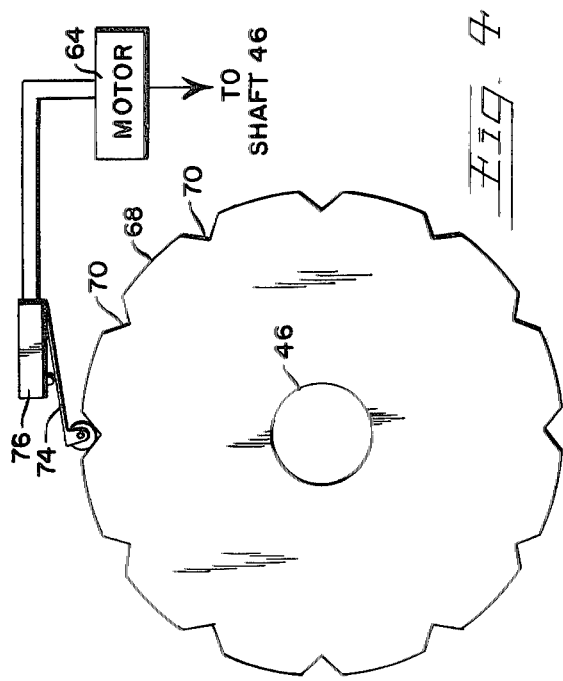
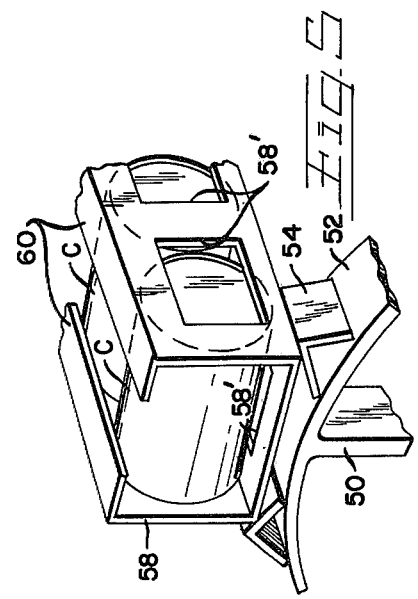
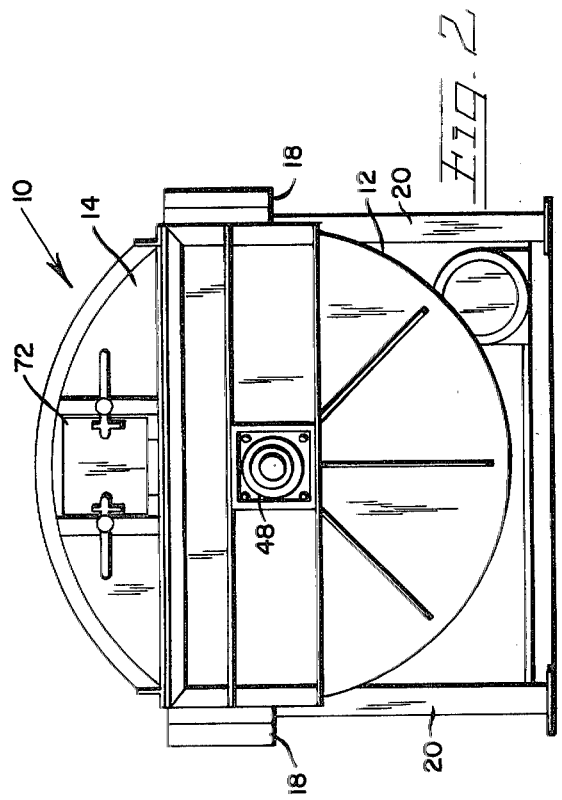
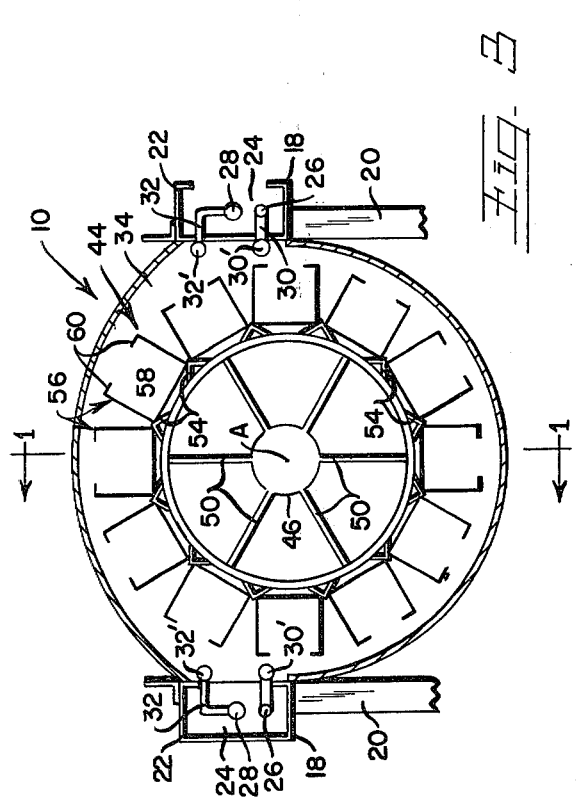

ROTARY RETORT

BACKGROUND OF THE INVENTION

This invention relates generally to apparatus for processing food products in sealed containers, and more particularly to a rotary retort for cooking food products in sealed containers.

It is common practice in the food processing industry to prepare certain products in sealed containers. Such products include, for example, fruits packed in syrup or vegetables packed in liquid. The product ingredients are placed in containers, the containers are sealed, and then processing is effected by heating the containers. It is, of course, extremely important when processing products in sealed containers that the processing action be strictly controlled to insure that the processing of the entire contents of the containers goes to completion. The time in which it takes to accomplish completion of processing is an important factor in the end quality and nutrative value of the product. Specifically, it has been found that the faster the entire contents can be cooked and cooled the better the end product. Concomitantly, the faster the process, the more product that can be produced economically in a given period of time.

One method for insuring the completion of the processing action of product in sealed containers in a minimum period of time is described in U.S. Pat. No. 2,517,542, issued Aug. 8, 1950, in the name of Clifcorn et al. In this method the sealed food product container is revolved end-over-end in a vertical plane. During rotation the container is heated, for example by steam, and then cooled, for example by water. The rotational speed of the container is selected such that the air trapped in the head space of the container moves through the food product to agitate the product. Agitation accelerates the rate of heat transfer from the heating (cooling) medium to the product to cook (cool) the product in a minimum time period. Additionally, the agitation insures that the contents are thoroughly mixed and completely cooked.

An apparatus utilizing the method of the Clifcorn et al. patent is shown in U.S. Pat. No. 2,816,841, issued Dec. 17, 1957, in the name of Kaap. The apparatus of the Kaap patent includes a retort which requires auxiliary baskets for loading and supporting the sealed containers in the retort. These baskets must then be supported by apparatus within the retort so as to prevent the containers from falling out of the baskets. Such basket supporting apparatus complicates the overall construction of the retort and decreases its overall reliability since such additional structure must withstand the environment within the retort.

SUMMARY OF THE INVENTION

This invention is directed to an improved rotary retort for cooking food products in sealed containers. The retort comprises a vessel including a substantially cylindrical shell and a pair of heads respectively closing the ends of the shell. A support for carrying the sealed containers is rotatably mounted within the vessel. The support includes at least one U-shaped channel member having integral lips located on the upstanding portions of the U-shaped channel, whereby a plurality of sealed containers received in th channel are retained in the channel by the lips. The support is rotated in the vessel and the interior of the vessel is selectively heated and cooled as the support is rotated to accomplish complete processing of the food products within the sealed containers.

BRIEF DESCRIPTION OF THE DRAWINGS

In the detailed description of the preferred embodiment of the invention presented below, reference is made to the accompanying drawings, in which:

FIG. 1 is a side elevational view of the rotary retort for processing food products in sealed containers according to this invention, with portions removed to fascilitate viewing;

FIG. 2 is a front elevational view of the retort of FIG. 1;

FIG. 3 is a front elevational view in cross-section taken along lines 3—3 of FIG. 1;

FIG. 4 is an enlarged view of the cam for controlling the intermittant rotational drive for the retort; and FIG. 5 is a view, in perspective, of a portion of one of the containers receiving members of the retort.

DESCRIPTION OF THE PREFERRED EMBODIMENT

Referring now to the drawings, the improved rotary retort 10 includes a cylindrical shell 12 closed at its ends by pressure heads 14, 16 to form a vessel capable of retaining steam under pressure in the retort for processing food in sealed containers. A pair of angle irons 18 extend radially from the shell 12 parallel to the longitudinal axis A of the shell. The shell 12 is maintained in a substantially horizontal disposition by legs 20 connected to the angle irons 18.

A second pair of angle irons 22, extending from the shell 12 parallel to the angle irons 18, cooperate with the angle irons 18 to form headers 24. Conduits 26 and 28 are supported in the headers 24 and extend for substantially the length of the shell 12. Conduit 26 is connected to a source of steam under pressure for heating the sealed containers in the retort 10, while conduit 28 is connected to a source of water for cooling the sealed containers. The conduits 26 and 28 are connected through branch pipes 30 and 32 to a respective series of nozzles 30' and 32'. The nozzles 30' and 32' extend into the interior cavity 34 of the vessel and are located longitudinally, at spaced intervals, along the shell 12 so that steam or water can be distributed evenly throughout the vessel. A valve 36 in conduit 26 controls the flow of steam through such conduit, and a valve 38 in conduit 28 controls the flow of water through such conduit. A valved return pipe 40, in flow communication with the interior cavity 34, is located at the bottom of the shell 12 to enable steam to flow through the cavity for processing purposes. Similarly a valved drain pipe 42, in flow communication with the interior cavity 34, is located at the bottom of the shell 12 to collect and drain the cooling water from the shell.

As best shown in FIGS. 2 and 3, a support 44 holds the sealed containers within the interior cavity 34 of the vessel during processing. The support 44 comprises a shaft 46 rotatably supported by bearings 48, located in pressure heads 14 and 16, so that the shaft is concentric with the shell 12. The shaft 46 has a plurality of equal length radial arms 50 connected thereto adjacent the ends of the shaft. Cylindrical sleeves 52 are fixed on the respective ends of the arms 50 so that the sleeves are also concentric with the shell 12. A plurality of V-shaped positioning blocks 54 are mounted on the sleeves 52 at equally spaced intervals about the periphery of the sleeves. The positioning blocks 54 support a plurality of container receiving members 56 fixed thereto so as to be substantially parallel to the shaft 46.

The members 56 comprise generally U-shaped channels 58 having lips 60 extending inwardly from the upstanding portions of the channels. The channels 58 and respective lips 60 thus form receptacles for the sealed containers to hold the containers in the members 56 as the members rotate. The dimensions of the receptacles are selected such that the cross-sectional area of the receptacles is substantially equal to the area of a vertical plane taken through the longitudinal axes C of a food container. The containers are thus received in the receptacles with the longitudinal axes C of respective containers transverse to the channels. In this manner, the containers may be placed in the channels 58 from one end thereof and are, by the lips 60, within the channels. Further, the channels 58 have a plurality of openings 58' defined therein to enable steam or water to reach substantially all portions of the containers retained in the channels.

The shaft 46 extends outwardly from the pressure head 16 and supports a pully 62. The pully 62, in turn, is connected to a motor 64 by a drive belt 66. Therefore, upon actuation of the motor 64, the motor rotates the shaft 46 within the shell 12 and, concomitantly the container receiving members 56. a cam disc 68 (FIGS. 1 and 4) is fixed on the shaft 46 to rotate therewith. The cam disc 68 has a plurality of notches 70 cut in the periphery thereof, the notches being spaced about the periphery in equal intervals corresponding to the interval spacing of the members 56 about the sleeves 52. The cam disc 68 is aligned with the members 56 so that when a channel 58 is substantially aligned with doors 72 in the pressure heads 14, 16, the notches 70 are contacted by an arm 74 of a switch 76 to close the switch. Closing of the switch enables a signal to be produced which is sent to the motor 64 to stop the motor. In this manner, as the shaft 46 is rotated it can be accurately stopped so that subsequent members 56 are brought into alignment with the doors 72. Thus the channels 58 are in position to be loaded with the sealed containers.

The operation of the rotary retort 10 is as follows: The motor 64 is actuated and rotates shaft 46 until the switch 76 is closed by the arm 74 detecting a notch 70 to stop the motor. At such time, as noted above, one container receiving member 56 is aligned with doors 70, 72. One of the doors is opened and the containers are loaded into the respective channel 58. As an illustrative example, the containers are No. 10 size sealed tin cans containing fruit pie filling (fruit plus starch-based syrup). By the described arrangement, the cans are readily loaded into the channel on their sides, the longitudinal axis of the cans transverse to the channel, so that the cans roll down the channel until the channel is filled. The motor 64 is again actuated to bring the next member 56 into alignment with the loading door. This procedure is repeated until all of members 56 are filled to the desired capacity with the cans to be processed.

When the retort is filled in the above manner, the motor 64 is actuated and the switch 76 is disabled so that the motor can continuously rotate the shaft 46 and the members 56 at a rate of about 8 revelations per minute, for example. As the members 56 are rotated, valve 36a opened to admit steam, through nozzles 30', into the interior chamber of the vessel and enable the steam to circulate through the chamber. In this example, the steam is at a temperature of between 230° F. and 240° F., and a pressure between 6 psi and 10 psi. Rotation of the shaft 46 and members 56 continues for between 20 to 25 minutes. During this time the steam completely cooks the fruit pie filling in the syrup. Completion of this process is substantially sided by the rotation of the cans about the axis A of the shaft 46 which causes the head space bubble in the respective cans to agitate the mixture therein. In this manner, the processing can go to completion in the minimum practical time with the insurance that the end product is of the highest possible quality.

After the steam processing phase is completed, the valve 36 is closed and valve 28 is opened to admit cooling water, through nozzles 32', into the interior chamber of vessel, cooling water is thus circulated through the chamber. In this example, the cooling water is at a temperature of between 50° F. and 180° F. at atmospheric pressure. Cooling of the cans by the water insures product quality of preventing over processing and, further, reduces overall processing time by enabling the cans to be cooled to a temperature at which the can be handled more quickly than if allowed to cool naturally. Once the cans are sufficiently cooled, the switch 76 can be enabled so that the motor 64 stops each of the members 56, in turn, in alignment with the doors 70, 72 so that the cans can be unloaded. As soon as the members 56 are all unloaded, the rotary 10 is ready to process a new batch of cans. It is, of course, clear that the steam temperature and pressure, the water temperature, the rotational speed of the shaft 46, and the processing time can be varied from batch to batch, and such parameters depend only upon the particular food product being processed.

What is claimed is:

1. Apparatus for processing food products in sealed containers, said apparatus comprising:
    a vessel including a substantially cylindrical shell and a pair of heads respectively closing the ends to said shell;
    support means for carrying the sealed containers, said support means including at least one U-shaped channel member rotatably mounted within said shell parallel to the longitudinal axis of said shell, said channel member defining a plurality of openings through the walls thereof comprising a substantial portion of the surface area of such walls, and integral lips located on the upstanding walls of said channel such that a plurality of sealed food product containers, received in said channel, are retained in said channel by said lips and are in flow communication with the interior of said vessel;
    means for rotating said support means within said vessel; and
    means for selectively heating and cooling the interior of said vessel, and accordingly the sealed containers, as said support means is rotated to accomplish complete processing of the food products within the sealed containers.

2. The invention of claim 1 wherein said heating and cooling means comprises first means for admitting pressurized steam into the interior of said vessel, and second means for admitting water into the interior of said vessel, such steam and water substantially contacting the sealed containers through the openings in said channels.

3. The invention of claim 1 wherein said support means includes a plurality of U-shaped channels substantially equidistantly spaced apart adjacent to the interior wall of said shell.

4. The invention of claim 3 in which at least one of said heads includes a door communicating with the interior of said vessel, and wherein said rotating means includes control means for selectively locating respective said channels in alignment with said door so that said channels can be loaded or unloaded with the sealed containers.

5. A rotary retort in which food products, in sealed containers, are cooked by pressurized steam and cooled by water, said retort comprising:
 a pressure containing vessel including a substantially cylindrical shell and a pair of heads respectively closing the ends of said shell;
 support means for carrying the sealed containers, said support means including a shaft rotatably supported in said heads so as to concentrically extend through said shell, a pair of equal diameter rings spaced along the longitudinal axis of said shell, means carried by said shaft for connecting said rings to said shaft and maintaining said rings spaced therefrom so as to be concentric with said shell, and a plurality of U-shaped channel members connected to said rings, said channel members respectively defining a plurality of openings through the walls thereof comprising a substantial portion of the surface area of such walls, and integral lips located on the respective upstanding walls of said channels such that a plurality of sealed food product containers, received in each of said channels, are retained therein by said lips and are in flow communication with the interior of said vessel;
 means for rotating said shaft about its longitudinal axis so as to rotate said support means within said vessel; and
 means for selectively heating and cooling the interior of said vessel, and accordingly the sealed containers, as said support means is rotated to accomplish complete processing of the food products within the sealed containers.

6. The invention of claim 5 in which at least one of said heads includes a door communicating with the interior of said vessel, and wherein said rotating means includes control means for selectively locating respective said channels in alignment with said door so that said channels can be loaded or unloaded with the sealed containers.

7. The invention of claim 6 wherein said control means comprises a cam disc mounted on said shaft, said cam disc having a plurality of notches defind in the peripheral surface thereof, said notches corresponding to the location of said channels relative to said door, a switch actuated by said notches to produce a signal for interrupting rotation of said support means by said rotating means to align a channel with said door, and means for disabling said switch to prevent signal production during processing of the sealed containers.

* * * * *